US008850017B2

(12) United States Patent
Ebrahimi et al.

(10) Patent No.: US 8,850,017 B2
(45) Date of Patent: Sep. 30, 2014

(54) BROKERING STATE INFORMATION AND IDENTITY AMONG USER AGENTS, ORIGIN SERVERS, AND PROXIES

(75) Inventors: Hashem Mohammad Ebrahimi, Salt Lake City, UT (US); Robert Drew Major, Orem, UT (US)

(73) Assignee: Novell, Inc., Provo, UT (US)

( * ) Notice: Subject to any disclaimer, the term of this patent is extended or adjusted under 35 U.S.C. 154(b) by 124 days.

(21) Appl. No.: 13/118,185

(22) Filed: May 27, 2011

(65) Prior Publication Data

US 2011/0231555 A1    Sep. 22, 2011

Related U.S. Application Data

(63) Continuation of application No. 09/484,691, filed on Jan. 18, 2000, now Pat. No. 7,954,144.

(51) Int. Cl.
*G06F 15/173* (2006.01)
*H04L 29/08* (2006.01)
*H04L 29/06* (2006.01)

(52) U.S. Cl.
CPC ........ *H04L 67/2814* (2013.01); *H04L 67/2819* (2013.01); *H04L 63/102* (2013.01); *H04L 67/02* (2013.01)
USPC .......................................................... 709/226

(58) Field of Classification Search
CPC ............................ H04L 63/028; H04L 67/281
USPC .......................................................... 709/226
See application file for complete search history.

(56) References Cited

U.S. PATENT DOCUMENTS

| 5,623,601 | A | * | 4/1997 | Vu .................................. 726/12 |
| 5,805,803 | A | | 9/1998 | Birrell et al. |
| 5,915,087 | A | | 6/1999 | Hammond et al. |
| 6,003,084 | A | * | 12/1999 | Green et al. .................. 709/227 |
| 6,006,268 | A | * | 12/1999 | Coile et al. .................... 709/227 |
| 6,115,742 | A | * | 9/2000 | Franklin et al. ............... 709/224 |

(Continued)

OTHER PUBLICATIONS

Huveneers, Richard. "SMB proxy authentication module". Sep. 28, 1999. pp. 1-3.*

(Continued)

*Primary Examiner* — Imad Hussain
(74) *Attorney, Agent, or Firm* — Schwegman, Lundberg & Woessner, P.A.

(57) ABSTRACT

Methods, signals, devices, and systems are provided for using proxy servers to transparently forward messages between clients and origin servers if, and only if, doing so does not violate network policies. In some systems, a transparent proxy uses a combination of standard-format HTTP commands, embedding auxiliary information in URLs and other tools and techniques to redirect an initial client request to one or more policy modules, such as a login server or an identity broker or an access control server. The policy module authenticates the request, and uses HTTP redirection to have the client transmit authorization data to the proxy. The proxy extracts the authorization data, directs the client to use a corresponding cookie, and subsequently provides the implicitly requested proxy services to the client in response to the client's subsequently providing the authorization data in a cookie. This is accomplished without requiring installation of any invention-specific software or hardware on either the client or the origin server, and also works with proxy servers that are known to the client. Unless the client request violates network policy, a person using the client will generally perceive no reduction of services, and will instead benefit from the proxy's caching and/or other performance enhancements.

20 Claims, 7 Drawing Sheets

(56) References Cited

U.S. PATENT DOCUMENTS

| | | | |
|---|---|---|---|
| 6,134,591 A | 10/2000 | Nickles et al. | |
| 6,173,311 B1* | 1/2001 | Hassett et al. | 709/202 |
| 6,182,141 B1 | 1/2001 | Blum et al. | |
| 6,182,226 B1* | 1/2001 | Reid et al. | 726/15 |
| 6,212,640 B1 | 4/2001 | Abdelnur et al. | |
| 6,317,838 B1* | 11/2001 | Baize | 726/11 |
| 6,327,242 B1* | 12/2001 | Amicangioli et al. | 370/216 |
| 6,374,359 B1 | 4/2002 | Shrader et al. | |
| 6,389,422 B1* | 5/2002 | Doi et al. | 707/784 |
| 6,389,462 B1* | 5/2002 | Cohen et al. | 709/218 |
| 6,401,125 B1* | 6/2002 | Makarios et al. | 709/229 |
| 6,473,791 B1* | 10/2002 | Al-Ghosein et al. | 709/217 |
| 6,505,230 B1* | 1/2003 | Mohan et al. | 709/202 |
| 6,510,464 B1* | 1/2003 | Grantges et al. | 709/225 |
| 6,578,151 B1* | 6/2003 | Nilsen | 726/11 |
| 6,715,080 B1 | 3/2004 | Starkovich et al. | |
| 6,728,884 B1 | 4/2004 | Lim | |
| 6,760,758 B1 | 7/2004 | Lund et al. | |
| 6,985,953 B1 | 1/2006 | Sandhu et al. | |
| 7,006,993 B1* | 2/2006 | Cheong et al. | 705/38 |
| 7,039,599 B2 | 5/2006 | Merriman et al. | |
| 7,305,473 B2* | 12/2007 | Vogt | 709/227 |
| 7,954,144 B1 | 5/2011 | Ebrahimi et al. | |
| 2001/0039587 A1* | 11/2001 | Uhler et al. | 709/229 |
| 2002/0002684 A1* | 1/2002 | Fox et al. | 713/200 |
| 2002/0007317 A1 | 1/2002 | Callaghan et al. | |
| 2002/0169818 A1* | 11/2002 | Stewart et al. | 709/202 |
| 2003/0140112 A1* | 7/2003 | Ramachandran et al. | 709/217 |
| 2006/0136555 A1* | 6/2006 | Patrick et al. | 709/203 |
| 2008/0028436 A1* | 1/2008 | Hannel et al. | 726/1 |
| 2011/0231443 A1* | 9/2011 | Hannel et al. | 707/776 |
| 2012/0167160 A1* | 6/2012 | Carney et al. | 726/1 |

OTHER PUBLICATIONS

University of Melbourne, The. "Squid". Nov. 13, 1998. pp. 1-9.*

* cited by examiner

US 8,850,017 B2

BROKERING STATE INFORMATION AND IDENTITY AMONG USER AGENTS, ORIGIN SERVERS, AND PROXIES

This application is a continuation of U.S. patent application Ser. No. 09/484,691, filed on Jan. 18, 2000, now issued as U.S. Pat. No. 7,954,144, which is incorporated herein by reference in its entirety.

FIELD OF THE INVENTION

The present invention relates to tools and techniques for maintaining state information and authenticating identity in a distributed computing system using an otherwise stateless protocol such as HTTP with conventional authentication modules, user agents, and origin servers, More particularly, the present invention relates to transparent proxy cookies and an identity broker which moderate the presentation of identity information and permit the use of HTTP cookies and proxy servers in an authenticated but transparent way without-requiring any changes to HTTP, to user agents, or to origin servers.

TECHNICAL BACKGROUND OF THE INVENTION

Corporate and institutional network administrators, Internet Service Providers, and others who are directly responsible for making networks run properly require tools and techniques for issuing and enforcing access policy. Appropriate policies must be embodied in servers and/or other computer processes in a computer network when that network provides access to the Internet or is otherwise concerned with security, authentication, filtering, caching, or similar issues. The software mechanisms which implement policy in the decentralized environment of a network are generally known as "middleware". In particular, access policy enforcement may call for some mechanism to uniquely identify users who access information through a proxy server.

Many Internet protocols are concerned with providing a service for brokering transport and application transactions between a client and a server. Only recently have Internet Engineering Task Force ("IETF") initiatives begun to address issues that arise in connection with brokering the relationships between middleware and a client, middleware and other middleware, and middleware and a server. For example, IETF Request For Comment 2109 ("RFC 2109") defines a mechanism for maintaining state between the endpoints of a transaction, but it says little about maintaining state when a proxy intermediates communication between those endpoints. Other sources have also shed little light on the problem of maintaining state information and performing middleware tasks such as authentication when a proxy is involved in the communication.

Some systems attempt to identify users by noting the IP address or other network address being used. But this does not distinguish between individual users who share a machine. For instance, in a multi-user UNIX Operating System, all of the users use the same IP address of the machine. Another example would be machine in a NAT (Network Address Translation) configuration where all of the machines in the NAT use the same IP address when access information on the Internet.

An HTTP Working Group memo authored by David M. Kristol entitled "HTTP Proxy State Management Mechanism" recognizes that it can be useful for an HTTP proxy server and its client (which could be a user agent or another proxy server) to share state. The memo describes two headers, Pcookie and Set-Pcookie, which carry state information between participating HTTP proxy servers and their clients. However, the Pcookie approach apparently fails with transparent proxy servers, that is, proxies that have not been directly identified as such to the client.

To better understand the benefits and limitations of current approaches and how they might be modified or replaced to better support middleware, we begin with a look at Hypertext Transfer Protocol ("HTTP"). HTTP is a stateless protocol, but it has been adapted to keep state information in data structures known as "cookies". Cookies are a mechanism which HTTP servers can use to both store and retrieve information on the client side of the connection. Cookies may be implemented with small data files that are kept in volatile or persistent memory on a client machine; for example, they may be written to a client's disk drive by a web server. These data files contain information the web server can use to track such things as login identifiers, lists of identifiers of pages downloaded by a client, or the date when a particular page was last sent to the client by the server.

FIG. 1 illustrates conventional tools and techniques for managing cookies. A user agent 100, such as a web browser, uses HTTP to seek access to resources such as web pages or database content through an origin server 102. The origin server is sometimes called a "target server" or "host" or "resource manager"; the state information is sometimes called the "context". Cookies and HTTP generally are well known in the art. In particular, RFC 2109 discusses cookies and their management.

During a step 104 the user agent 100 makes a request directed to the origin server 102. For instance, the request may be an HTTP request for a web page. Assume that the origin server 102 is configured to attempt to maintain state information about the particular user agent 100, and that the server 102 tries to maintain that state information at least in part on the user agent 100 instead of storing it all on the server 102. During a step 106 the server 102 sends the user agent 100 a response with some or all of the state information the user agent 100 should store. In HTTP, this is done using cookies; a cookie is introduced to the client by including a Set-Cookie header as part of an HTTP response.

Assume that the user agent 100 is configured to accept the cookie, and stores it. During a step 108 the user agent 100 again sends the origin server 102 its request, but this time the cookie is included in the HTTP header, indicating the user agent's acceptance of the cookie. During a step 110 further interaction may then take place between the user agent 100 and the origin server 102.

This further interaction may include numerous requests and responses. In particular, as shown in RFC 2109 and otherwise well known, step 110 may include additional responses with cookies from the origin server 102 (The accompanying diagrams note the cookies in the responses with the words "set cookie".) These cookies result in corresponding requests from the user agent 100, with the corresponding cookies in the headers of the corresponding responses. The step 110 may also include transmittal of web pages, applets, or other data from the server 102, and text or button clicks or other POST operations by the user agent 100.

FIG. 2 illustrates conventional tools and techniques for using a known proxy server 200 to filter out cookies. The proxy server 200 is known to the user agent 100 in the sense that the IP address, domain name, or other identifying information about the proxy server 200 has been stored on the user agent 100 to configure the user agent 100 so that the user agent 100 expressly directs a request 202 to the proxy server 200 for origin server 102 resources. For instance, commonly used web browsers allow one to specify a proxy server by entering the server's IP address through the application's configuration user interface.

In response to request 202, the proxy server 200 may forward a corresponding request 204 to the origin server 102. On the other hand, if the access policy enforced by the proxy server 200 denies access to the origin server 102 for the user agent 100, the request 204 will not be sent. The proxy server 200 may also be used for caching, which will reduce the response time when one or more user agents 100 request the same data previously retrieved from the origin server 102.

In addition to filtering (a.k.a. "blocking" or "screening") outgoing requests from the user agent 100, the proxy server 200 may be configured to filter incoming cookies. This may be done to protect the privacy of the person running the user agent 100. That is, the proxy server 200 may be an "anonymizer". Instead of forwarding the cookies to the user agent 100, the proxy server 200 saves the cookies sent in 206, associates them with the user agent in 202, and generates and provides a request(s) 208 to the origin server 102 without contacting the user agent 100 again. The request identifies (through IP addresses, for instance) the proxy server 200 as its source, instead of identifying the user agent 100. The request 208 may or may not include cookies included in previous responses from the origin server. It may include a dummy cookie in its header. The dummy cookie meets the minimal syntactic and semantic requirements for a regular cookie, but it has no information that the origin server 102 can use to relate the data transmitted in 202. This technique preserves the anonymity of the user and user agent 100.

During steps 210 and 212, there may be further interaction between the origin server 102 and the proxy server 200, and between the proxy server 200 and the user agent 100. This further interaction may come soon after the previous steps, or it may occur over a short or long period of time afterward, with or without substantial intervening periods of inactivity. To the extent that this further interaction involves cookies, the proxy server 200 may block the cookies to prevent them from reaching the user agent 100, as just described.

FIG. 3 illustrates conventional tools and techniques for using a known proxy server 300 which supports cookies. The initial steps are those shown in FIG. 2; a request 302 sent to the proxy server 300 results in a corresponding request 304 to the origin server 102.

But instead of blocking incoming cookies 306, the proxy server 300 forwards 308 them to the user agent 100. The user agent 100 accepts the cookies, and later will provide a response in the form of a request 310 containing the cookie in a header. The proxy server 300 forwards 312 this request—with the cookie—to the origin server 102. Although the request 312 identifies the proxy server 300 as the source IP address, the cookie in the request 312 header identifies the user agent 100 and may contain private user information, either explicitly represented or encoded in a way known only to the origin server 102.

During steps 314 and 316, there may be further interaction between the origin server 102 and the proxy server 300, and between the proxy server 300 and the user agent 100. To the extent that this further interaction involves further cookies from the origin server 102, the proxy server 300 forwards those requests to the user agent 100. That is, the proxy server 300 does not block cookies. Likewise, the proxy server 300 forwards cookies from the user agent 100 to the origin server 102; the proxy server 300 does not substitute dummy cookies.

Of course, the proxy server 300 can still perform caching, filtering according to IP addresses, and other conventional proxy server functions.

FIG. 4 illustrates conventional use of a transparent proxy 400. Unlike the known proxy servers 200 and 300, the transparent proxy server 400 is unknown to the user agent 100. That is, the user agent 100 itself has not been configured to communicate with the transparent proxy 400. Instead, the transparent proxy 400 is inserted in the communication path by means of capturing network traffic at a router or gateway with access to all traffic transmitted between the user agent 100 and the origin server 102. This capture is effected without any modification to the user agent 100. The transparent proxy 400 may be inserted to perform caching or to enforce access control policy on user agent requests.

Like the known proxy server 200 shown in FIG. 2, the transparent proxy 400 can filter out cookies in responses from origin servers 102. The transparent proxy can also modify or replace cookies sent in HTTP messages from the user agent 100.

In neither of the two cases described in FIG. 3 or FIG. 4 can the proxy 300 or 400 assure that every request or other HTTP message sent from the user agent 100 contains a cookie with information known to the proxy 300 or 400. Thus, if the proxy 300 or 400 needs to associate persistent information with the user agent 100 (information such as identity or other attributes), it cannot do so using cookies with the current state of the art. This puts proxies at a disadvantage with respect to origin servers, because the origin servers can use cookies for storing persistent user agent information and for having that information forwarded by user agents as part of requests as in 302. User agents only include cookies to requests directed at origin servers that have previously included cookies in replies. In contrast, because proxies are normally not the target of user agent requests, user agents will not attach cookies that are specific to proxies to the requests. Thus, conventional proxies are unable to adequately provide information service enhancements based on user identities or other persistent attributes.

Thus, it would be an advance in the art to provide better tools and techniques for brokering contextual relationships between and among clients, middleware, and origin servers, so that relevant information is propagated among and between platforms in an appropriate manner.

It would be a further advancement to provide such improvements without greatly intruding on the transaction endpoints (clients and origin servers), that is, without substantially reducing performance, without requiring changes to HTTP, and without requiring additional software on clients or origin servers.

Such improvements are disclosed and claimed herein.

BRIEF SUMMARY OF THE INVENTION

The present invention provides tools and techniques that permit the effective use of "cookies" between a client and an origin server when a proxy server intermediates between them. The invention does not require new software on either the client or the origin server, and it allows continued use of existing protocols such as HTTP, HTTPS, and the protocols governing conventional cookie format. Unlike the Pcookie approach, which is limited to use with known proxies, the present invention works with known proxies and/or transparent proxies.

The invention provides transparent proxy cookies that maintain the client-proxy-origin server relationship in a manner that is not intrusive to the client and the origin server.

Proxy cookies according to the invention generally resemble conventional (origin server) cookies, but the inventive proxy cookies are requested or supplied by a proxy server rather than an origin server or a client. The invention also provides novel combinations of elements such as redirecting requests, interposing middleware in a sequence of HTTP or other exchanges, including state information in uniform resource locators ("URLs") or other universal resource identifiers ("URIs"), including state information in HTTP headers as cookies, and selectively forwarding or modifying state information.

For instance, suppose a client browser A on an intranet requests an HTTP object R residing on a remote origin server X. In this example, all HTTP requests in the intranet are directed through one or more transparent proxy servers, pursuant to a policy requirement that only clients which have successfully logged onto the network may make HTTP requests. Different and/or other policy constraints may also be present, such as one stating that only login identities with certain properties and property values can make successful requests from the intranet for access to a particular external site.

A given transparent proxy B will not necessarily recognize client A which is making the request, if earlier requests from client A were serviced by a different proxy or if this is the first request to the origin web server X. In order for the current proxy B to establish, retrieve, and maintain state, the invention uses state tokens in the form of transparent proxy cookies. First, B examines the HTTP request that it receives from client A for an object R on the origin server X, and determines that the request does not contain a proxy cookie meeting the intranet policy requirements.

B therefore formats an A-B-I state token appended to or otherwise embedded in the redirection target address, and redirects A to an identity broker I along with relevant request data appended to the identifier or otherwise attached to the HTTP redirect command. That is, B uses the conventional HTTP redirect facility to redirect the request to a possibly novel target, and B may use familiar techniques to append or embed data into an URL or URI to place novel proxy cookie data in the command with the target address. Identity broker I extracts or otherwise separates the A-B-I state token from the address or request header, verifies B's credentials, and uses the HTTP redirect facility to redirect A to a login service L that can validate A's identity and give it authorization to use the network. The login server L redirects A's request back to the identity broker I after A successfully logs in (note that proxy B, identity broker I, and login service L can be all be running on the same machine). The identity broker I formats an A-B-X state token according to the access policy governing A, B, X, and possibly the URL or URI or other information in the user agent request, and redirects A to B with the formatted A-B-X state token appended to or otherwise embedded in the redirection target address. User validation performed by the identity broker I and/or the login server L may be accomplished using Novell Directory Services software ("NDS"), Lightweight Directory Access Protocol software ("LDAP"), Remote Authentication Dial In User Service software ("RADIUS"), SQL software, user list (UNIX-style) authentication, and/or other familiar authentication tools and techniques.

The proxy B extracts or otherwise separates the valid token in the target address, and responds to A with an HTTP redirection to the origin server X, using the original URL from A's initial request as the location for the redirection; when A then requests the resource from origin server X, B responds with a another redirection, for exactly the same resource, and this redirection contains the valid A-B-X state token in its header as a proxy cookie. It is important to note that because B is a proxy, it can send cookies that A will use when requesting resources from X. A then re-requests the resource from X, this time with the proxy cookie required by B contained in the request header. The proxy B sees the request, recognizes the proxy cookie as one that B issued, strips the proxy cookie from the header, and if the requested data is not cached locally, it forwards the request to the origin server X without the B.

X may respond with a "set cookie" command directed at A but intercepted by B. If X does its own "set cookie" for A, B will simply forward that cookie to A; in subsequent requests from A to X that contain the cookie, B also forwards the cookie destined for X from A to X. Also, in subsequent requests from A for resources on X, A will include the proxy cookie with the A-B-X state token. Upon receiving the cookie with the A-B-X state token, B will recognize that A has permission to access X and will not need to redirect the request to the identity broker I. B will always remove the cookie with the A-B-X state token before forwarding the request to X. In responding to A, the login server L and/or the identity broker I may send cookie(s) to A; upon subsequent redirection to L or I, A will include the appropriate cookie(s), and the information in cookie(s) (for example, the A-B-I state token) will constitute temporary notification that A's credentials have been validated for the purposes of login, and this will avoid requiring additional login conversations between A and either L or I.

From client A's point of view, A is communicating directly with origin server X when in fact A's messages are intercepted by transparent proxy B and forwarded to X as if they came from A. From origin server X's point of view, X is communicating directly with client A when in fact X's messages are intercepted by transparent proxy B and forwarded to A as if they came from X. Of course, two or more transparent proxy servers may be similarly interposed, so that client A and origin server X assume they are communicating directly with one another when in fact each communicates through a different transparent proxy. Throughout the process, the proxy server caches web pages using conventional means, to reduce system response time.

Similar steps are taken if A wants to access resources on another server, origin server Y. As noted, for A to obtain resources from X, A is logged in and the necessary steps are taken so that A will send the A-B-X token when A goes through B to X. If A wants to go through B to Y, a corresponding A-B-Y token is needed. When A requests a resource of Y and the request is not accompanied by the A-B-Y token, B redirects A to I to get that token generated. A will include the A-B-I state token when accessing I. Since the A-B-I state token is included in the request from A, I will not redirect A for authentication to L. I formats the A-B-Y token and redirects to B. B then uses two redirections to Y so that A will use the A-B-Y token when accessing resources on Y, and the process proceeds generally as it did when A was using the A-B-X token to access X. One possible variation is an embodiment in which transparent proxy B redirects A to login server L (instead of identity broker I) the first time B sees a request from A with no state token. In another variation, L redirects A to a different identity broker I2 (perhaps I goes down during login), requiring secure directory service and/or out-of-band (non-HTTP) transactions among middleware components. In each case, however, contextual information is created and maintained in a manner that is transparent: both to the particular transaction between the endpoints A and X (e.g., a transaction which adds an item to a shopping cart), and to the conventional endpoint apparatus and methods (e.g., browsers, web servers, applets, scripts, and so on at the endpoints).

The robustness of this approach can be illustrated by the following example. Suppose A's next request is forwarded through transparent proxy B2 because of load balancing, B's failure, or some other reason. B2 sees the A-B-X token, but its access policy dictates that the A-B-X to A-B2-X failover not be performed without further authorization. B2 can redirect A to identity broker I, along with any pertinent B2 state data and the A-B-X token, all such information being encoded in the target address to which A is redirected. I extracts the B2 state data and valid A-B-X token, and according to its access policy either formats an A-B2-X token or rejects the request. Note that I's granting of an A-B2-X token may depend on the successful completion of a sequence of transactions with other agents, which may or may not include the participation of A, and which may or may not be transacted partially or entirely out-of-band. If the access policy permits I to grant an A-B2-X token, I redirects A to B2. Then B2 twice redirects A to the origin server X, the second time with the A-B2-X token; when the second redirected request passes through B2, B2 sees the A-B2-X token, and the transaction moves forward with B2 as the transparent proxy instead of B.

Although the invention is illustrated primarily with server-client cookies, it may be readily used with other state information that provides a context for the relationship between two clients, a client and a server, or two servers, whenever a transparent proxy intermediates that relationship. Likewise, many of the examples use an identity broker but other authentication, filtering, or administrative middleware may also be used. In particular and without limitation, the present invention can be used with a URLs or URI transformer that modifies non-secure URLs or URIs in data being sent from a target server to a client by replacing them with corresponding secure URLs or URIs to promote continued use of secure sockets layer communication, as described in commonly owned copending application Ser. No. 09/268,795. The embodiments described above, like those discussed elsewhere herein, are illustrative not comprehensive. Other features and advantages of the invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to methods, systems, signals, and devices for brokering state information and identity among user agents, origin servers, and known or transparent proxies. In particular, the invention provides and uses tools and techniques for receiving conventional HTTP requests and cookies and modifying them or supplementing them to permit their use with transparent proxies, authentication tools, login servers, and other implementations of network policy requirements. Various components of the invention and/or its operating environment are discussed below.

Computers and Networks

Distributed computing systems which may be configured according to the invention include computer networks, both individually and in aggregations, as well as computers which are connectable to such networks. By way of example, suitable computer networks include local networks, wide area networks, and/or the Internet.

"Internet" as used herein includes variations such as a private Internet, a secure Internet, a value-added network, a virtual private network, or an intranet. The computers connected by the network may be workstations, laptop computers, disconnectable mobile computers, servers, or a combination thereof. The network may include one or more LANs, wide-area networks, Internet servers and clients, intranet servers and clients, or a combination thereof.

Figure 1:
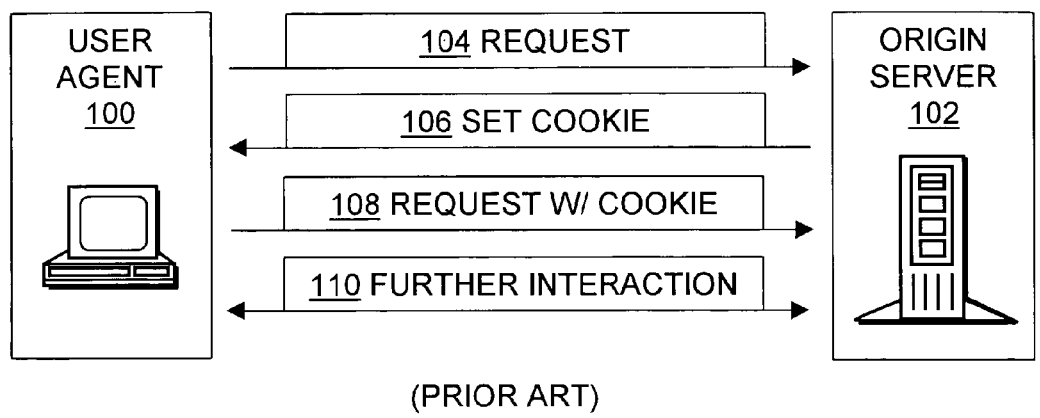
FIG. 1 is a data flow diagram illustrating in a conventional system the use of cookies without a proxy server.
Figure 2:
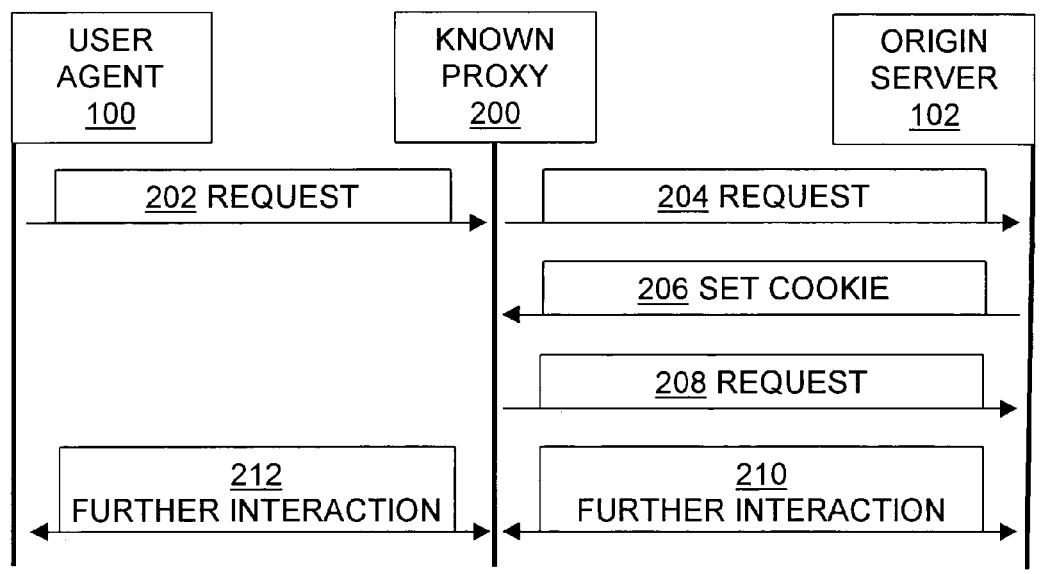
FIG. 2 is a data flow diagram illustrating in a conventional system the use of a known proxy server to block cookies.
Figure 3:
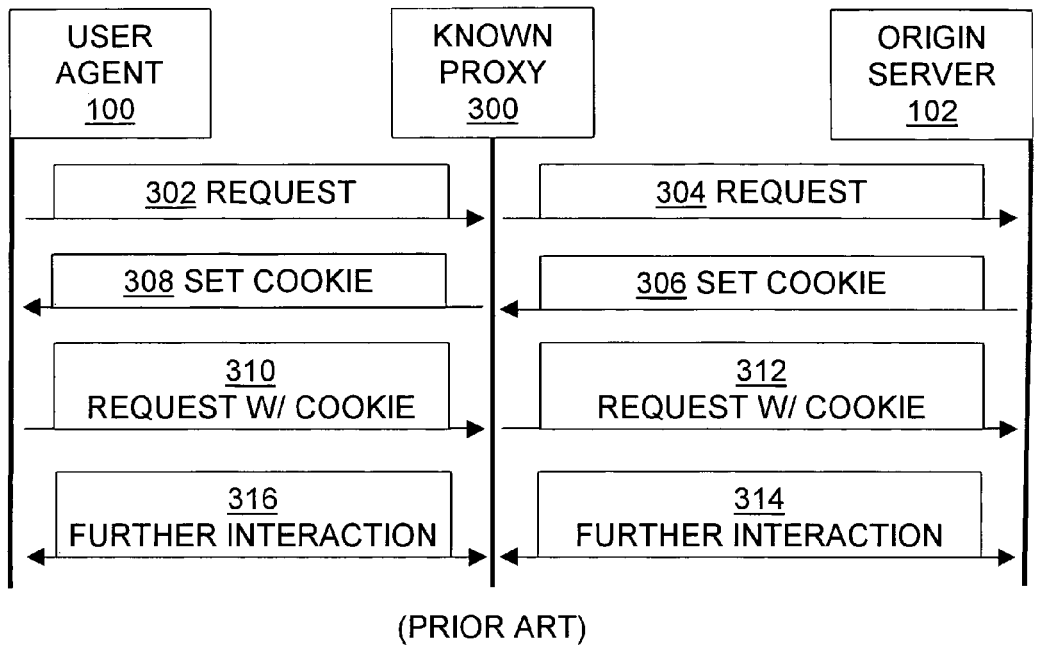
FIG. 3 is a data flow diagram illustrating in a conventional system the use of a known proxy server to support cookies.
Figure 4:
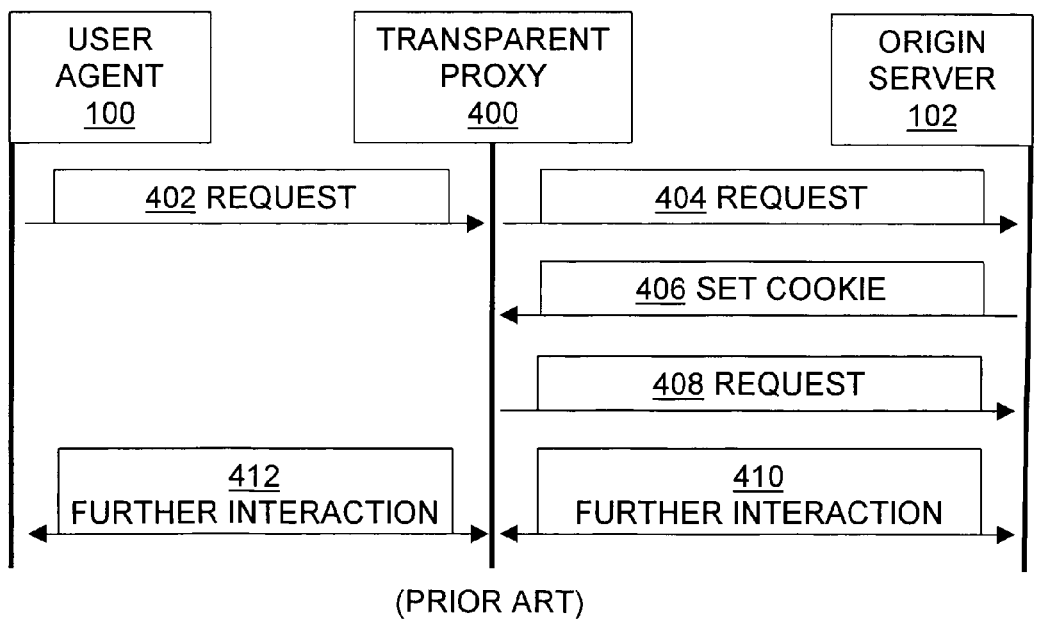
FIG. 4 is a data flow diagram illustrating in a conventional system the cookie-blocking effect of a transparent proxy server.
Figure 5:
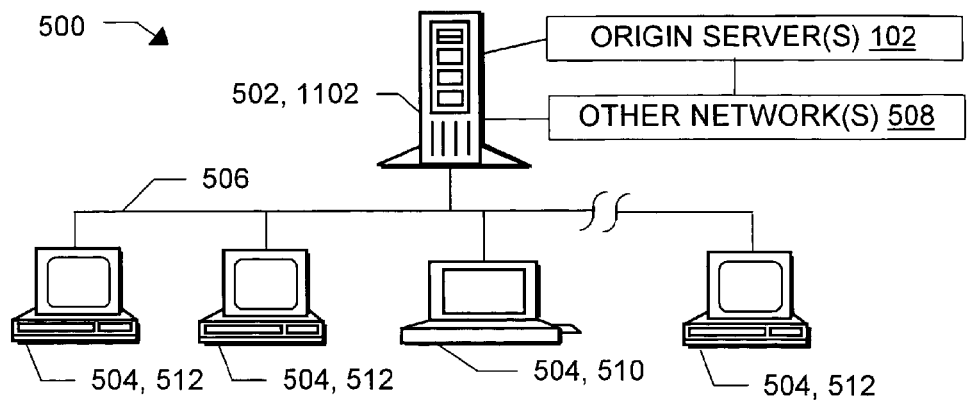
FIG. 5 is a diagram illustrating a computer network and computers which are suitable for use individually and collectively according to the present invention, including a transparent proxy server for forwarding communications between local area network clients and origin servers.

One of the many computer systems suited for use with the present invention is indicated generally at 500 in FIG. 5. In one embodiment, the system 500 includes Novell NetWare(r) network operating system software (NOVELL and NETWARE are registered trademarks of Novell, Inc.). In alternative embodiments, the system 500 includes NetWare Connect Services, VINES, Windows NT, Windows 95, Windows 2000, LAN Manager, or LANtastic network operating system software and/or an implementation of a distributed hierarchical partitioned object database according to the X.500 protocol such as Novell Directory Services or Lightweight Directory Access Protocol ("LDAP") directory services. (NOVELL DIRECTORY SERVICES is a registered trademark of Novell, Inc.; VINES is a trademark of Banyan Systems; NT, WINDOWS 95, WINDOWS 2000, and LAN MANAGER are trademarks of Microsoft Corporation; LANTASTIC is a trademark of Artisoft).

The system 500 includes at least one transparent proxy server 502 or novel known proxy server 1102 which intermediates between one or more origin servers 102 and one or more clients 504. The novel known proxy server 1102 is known in the sense that (unlike a transparent proxy) it is known to the user agent 100, and is novel in the sense that it embodies tools or techniques of the present invention. For convenience, reference is generally made herein to one origin server 102, one transparent proxy server 502, and one client 504, but some embodiments of the invention include more than one transparent proxy server 502 and/or novel known server 1102. Likewise, some embodiments include one or more origin servers and/or clients 504, and/or permit proxy 502 and/or 1102 communication with more than one origin server 102 and/or more than one client 504. For clarity, most examples refer to a transparent proxy server 502 but a known proxy server 1102 may be used similarly unless otherwise indicated.

The illustrated system 500 includes a local area network 506 which is optionally connectable to other networks 508, including other LANs or portions of the Internet or an intranet, through a gateway or similar mechanism. The local area network 506 may include additional servers (running on the same or different computers as the proxy 502, 1102) which are configured as directory service providers or name servers, as software component (e.g., COM or Java) or other object servers, file servers, print servers, or as a combination thereof. A given computer may function both as a client and as a server; this may occur, for instance, on computers running Microsoft Windows NT or Windows 2000 software.

The server and client computers may be uniprocessor or multiprocessor machines. The server(s) 502, 1102 and clients 504 each include an addressable storage medium such as random access memory and/or a nonvolatile storage medium such as a magnetic or optical disk. Suitable network clients 504 include, without limitation, laptops 510, personal computers 512, workstations, dumb terminals, information appliances, personal digital assistants, and other handheld and/or embedded processing systems.

The proxy server(s) 502, 1102 and the clients 504 are connected by network 506 signal lines. The signal lines 506 may include twisted pair, coaxial, or optical fiber cables, telephone lines, satellites, microwave relays, modulated AC power lines, and other data transmission "wires" known to those of skill in the art. Signals according to the invention may be embodied in such "wires" and/or in the addressable storage media (volatile and/or nonvolatile).

The proxy server 502/1102 and the client 504, on the one hand, and the proxy server 502/1102 and the origin server 102, on the other hand, communicate using at least one communications protocol. The protocols of primary interest here are those above the network transport layer, such as application layer protocols. Familiar examples of such protocols include Hypertext Transfer Protocol ("HTTP") and HTTP over a Secure Sockets Layer ("HTTPS"), but other protocols now known or hereafter developed may also be used with the invention. Generally, any computer communications protocol which supports redirection from one server to another and which benefits from state tokens (whether cookies or otherwise) exchanged between clients and servers may be used according to the present invention.

The proxy server 502/1102 is capable of using floppy drives, tape drives, optical drives or other means to read a storage medium. A suitable storage medium includes a magnetic, optical, or other computer-readable storage device having a specific physical substrate configuration. Suitable storage devices include floppy disks, hard disks, tape, CD-ROMs, PROMs, RAM and other computer system storage devices. The substrate configuration represents data and instructions which cause the computer system 500 to operate in a specific and predefined manner as described herein. Thus, the medium tangibly embodies a program, functions, and/or instructions that are executable by the proxy server 502/1102 to perform steps for brokering state information between computers and otherwise supporting proxy services substantially as described herein.

Figure 11:
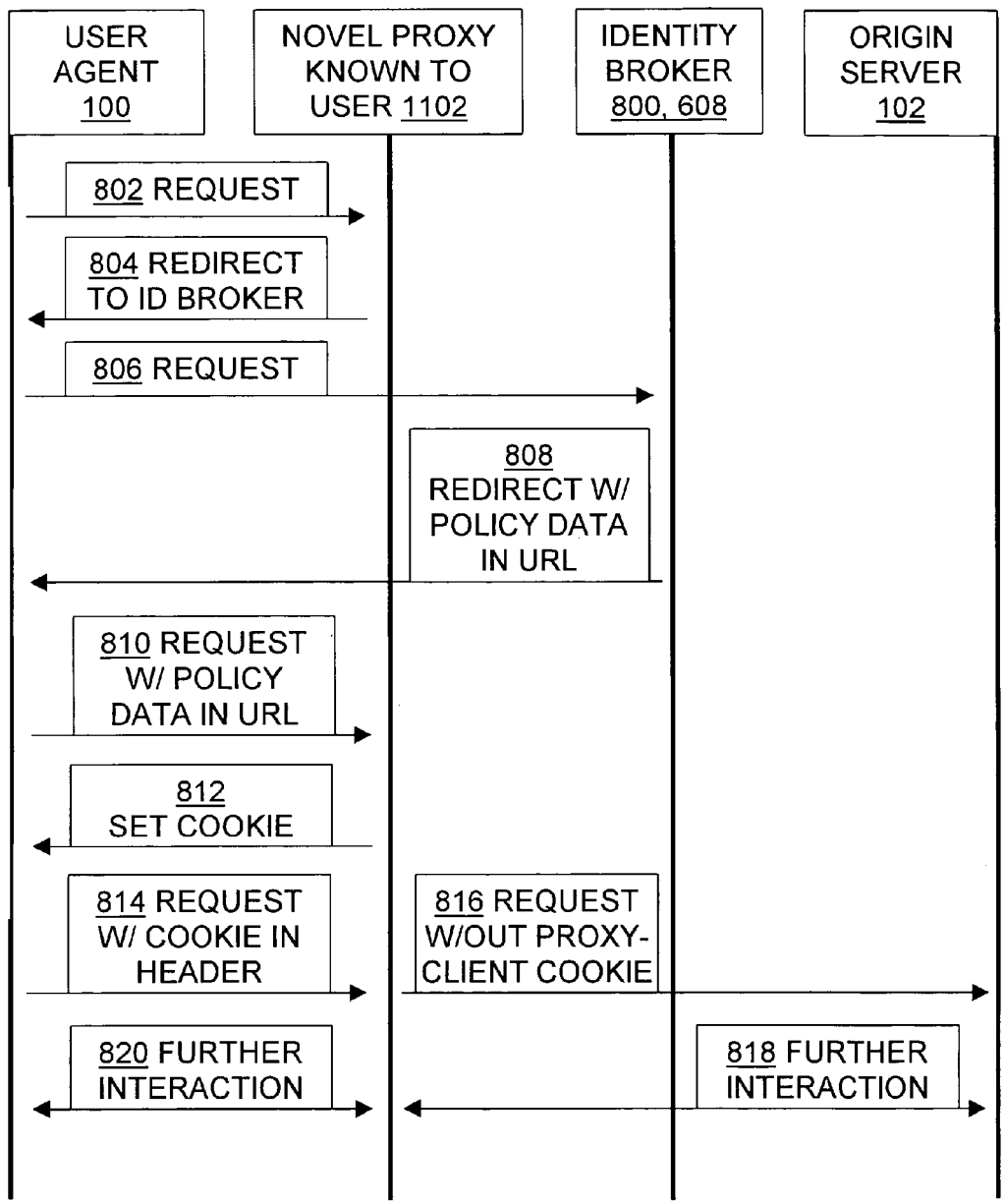
FIG. 11 is a data flow diagram further illustrating tools and techniques of the present invention in which a known proxy server supports cookies.

Although particular individual and network computer systems and components are shown in FIGS. 5 and 11, and in the other figures, those of skill in the art will appreciate that the present invention also works with a variety of other networks and computers.

Transparent Proxy Server

Figure 6:
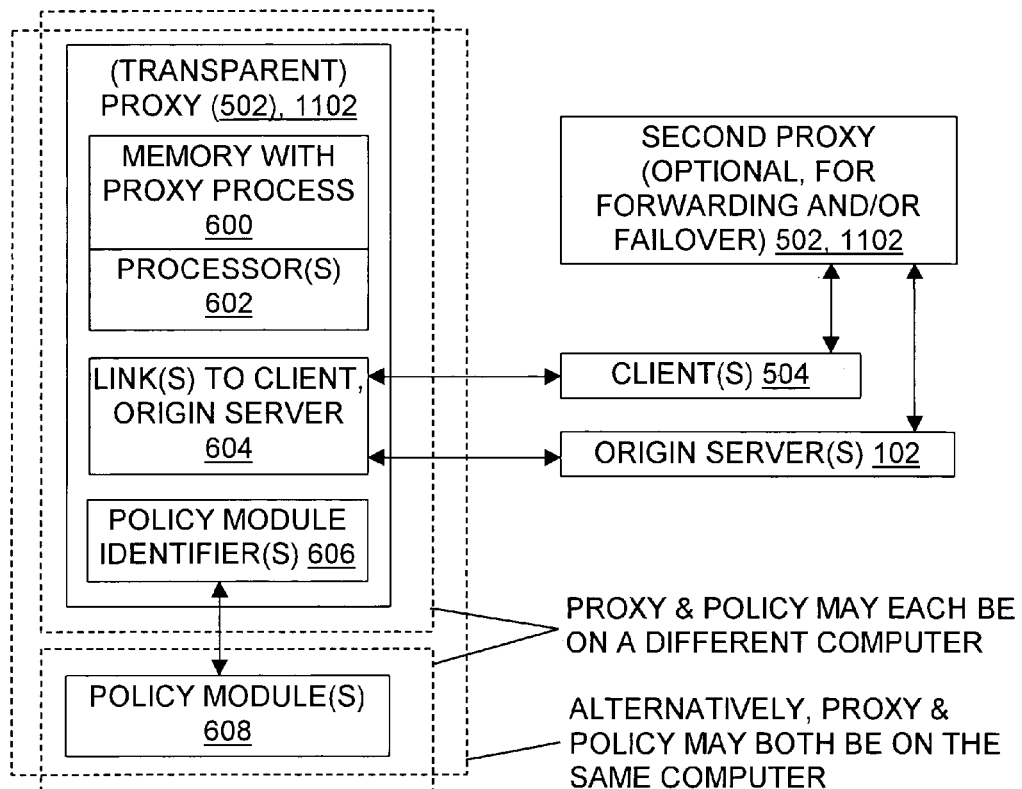
FIG. 6 is a diagram further illustrating the novel transparent proxy server of FIG. 5, and also showing components of the transparent proxy server's operating environment.

FIG. 6 further illustrates the transparent proxy server 502/ known proxy server 1102 and its environment. The proxy server 502/1102 includes a memory 600 which is configured with a transparent/known proxy server process. The transparent proxy server process, and thus the proxy 502, operates according to the steps described in connection with FIGS. 7-9 and the signals shown in FIG. 10. The known proxy server process, and thus the proxy 1102, operates according to FIGS. 7 and 11. Suitable memories 600 include volatile (e.g., RAM, SRAM) and/or non-volatile (e.g., hard disk, tape, CD-ROM) memory which is readable by a computer and which is configured with a computer program for performing transparent proxy server process steps as described herein.

The proxy server 502/1102 also includes a processor 602 for running the proxy server process. Accordingly, the processor 602 is in operable communication with the memory 600 and with any necessary I/O devices (not shown). Computer memories and processors in general are well known. The advantages of the present invention, such as transparent support for policy enforcement, caching, and other proxy services, are obtained by configuring and using the memories and processors in the particular ways described herein.

The proxy server 502/1102 also includes at least one link 604 for networked communication with the client(s) 504 and the origin server(s) 102. Suitable links include HTTP links, HTTPS links, and other familiar links. Such links are generally known in the art, but their use as described herein is new.

In addition, the proxy server 502/1102 includes at least one policy module identifier 606 which directly or indirectly identifies one or more policy modules 608. Indirect identifiers include code or flags for broadcasting a request for a policy module to contact the proxy server 502/1102. Direct policy module identifiers 606 include network addresses or Universal Resource Identifiers ("URIs") specifying a particular policy module 608.

Some policy modules 608 include an identity broker 800 (FIG. 8) which keeps user identity/policy information that controls or influences security software, access control software, or similar software to grant and/or deny access to services requested by the client.

Some policy modules 608 include a login server 900 (FIG. 9) which accepts login requests, checks the credentials or other authenticating information of the user (human or computer process) that is trying to log onto the system 500, and either grants or denies logged-in status.

As indicated in FIG. 6, in some embodiments the transparent proxy server process and the policy module each run on a different computer, whereas in other embodiments they both run on the same computer.

FIG. 6 also shows an optional second proxy server, which may be used for forwarding and/or failover. Forwarding occurs when more than one proxy server intermediates between a client 504 and an origin server 102. For instance, a given request might travel from the client 504 to a first proxy 502/1102, from there to a second proxy 502/1102, and then to the origin server 102. Failover occurs when a first proxy becomes unavailable and a second proxy takes over the handling of client requests in place of the first proxy. Forwarding and/or failover may be provided by a cluster of proxies, for instance, so that some of the requests from the client 102 go to the first proxy 502/1102 and some go to the second proxy 502/1102 in the cluster. In connection with forwarding or failover, the second proxy server may be configured differently than the first proxy server, as when the second proxy identifies different policy modules, but the second proxy otherwise generally provides the same functionality as the first proxy. The proxies involved in forwarding and/or failover may all be transparent proxies 502, may all be known novel proxies 1102, or may include a combination of transparent proxies 502 and known proxies 1102.

Methods

Figure 7:
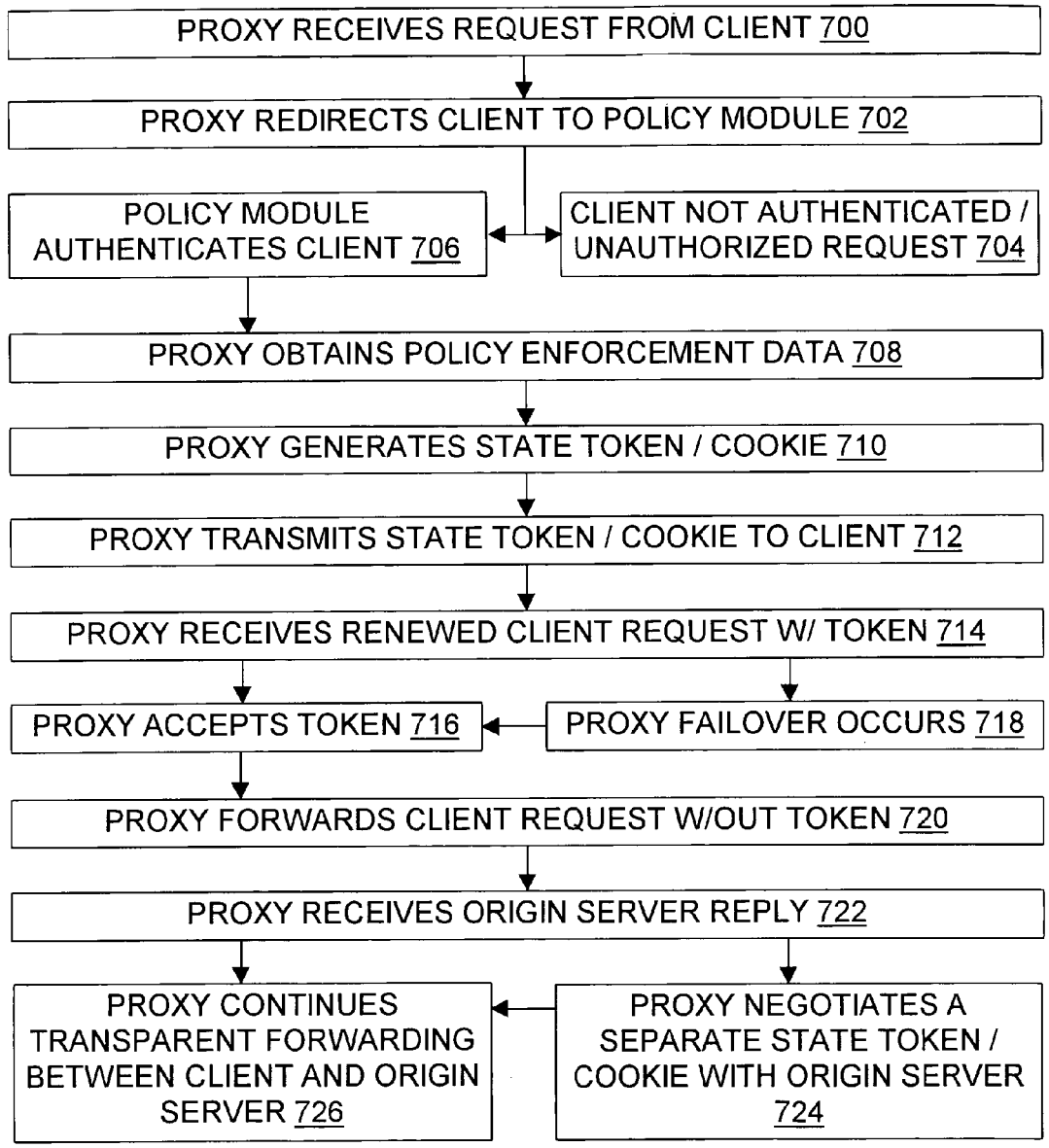
FIG. 7 is a flowchart illustrating novel methods of the present invention.

FIG. 7 illustrates methods according to the invention, from the perspective of a transparent proxy server 502 or a known proxy server 1102 operating according to the invention. Operation of the invention is also illustrated and discussed in connection with the data flow (e.g., FIGS. 8, 9 and 11), signals (e.g., FIG. 10), and structural components (e.g., FIGS. 5 and 6) of the invention. Unless indicated otherwise, discussions of the inventive methods also apply to inventive systems, discussions of signals also apply to methods, and so on, in order to make this specification more concise than it would be otherwise.

During a request receiving step 700, the proxy server 502/1102 receives a request, from the user agent 100 running on the client 504, for a resource of the origin server 102. For instance, a web browser 100 might make an HTTP request for a copy of the web page(s) identified by a particular uniform resource locator ("URL").

Because the proxy 502 is transparent to the client 504, the client 504 generally does not direct the request specifically to the proxy 502. Instead, the request arrives at the proxy 502 through the intervention of some other process. For instance, the proxy 504 might be the designated gateway for handling URLs whose domain names correspond to an IP address outside the local network 506. A router that the client is going through may redirect all of the requests destined for a web server (port 80) to the proxy 502, or the client may have an IP Gateway that redirects all of the requests destined for a web server (port 80) to the transparent proxy 502.

Assume that the proxy 502/1102 is configured to enforce at least one policy requirement. If forwarding the client request toward the origin server 102 would not violate that policy requirement, then the proxy 502/1102 forwards the request; in effect, the method skips steps 702-718 and performs step 720. But in the situations of primary interest here, the proxy 502/1102 determines that forwarding the client request toward the origin server 102 might violate a policy requirement. Accordingly, during a step 702, the proxy 502/1102 redirects the client 504 to a policy module 608 so the policy module 608 can determine whether forwarding the client request would, in fact, violate policy. Redirection may be performed using a standard redirection command, such as an HTTP redirection command. The redirection command may include B's identity, in the form of a URL, network and port address, or other identifier, "munged" or otherwise encoded into the redirection URL by appending or other methods, so that the policy module 608 can determine which proxy's services are being implicitly requested by the client.

The policy module 608 makes a determination of whether to allow the client request to proceed. For instance, the policy module 608 may determine that the client 504 in question is not authorized to make the specific request, e.g., the requested web page is off-limits to that client 504. The policy module may determine that no client 504 is authorized to access the resource in question through the proxy 502/1102, e.g., the entire web site is off-limits to everyone working at the company. Or the policy module 608 may determine that the client 504 in question lacks the necessary passwords, keys, or other authentication credentials to use the particular proxy 502/1102. In response to these and similar determinations, the client request does not progress in the system 500 past a refusal step 704, at least not unless the policy module 608 later determines that forwarding the client request would not violate policy.

However, in the situations of primary interest here the policy module 608 determines during a step 706 that forwarding the client request toward the origin server 102 will not violate policy. Authenticating or otherwise authorizing the request during step 706 may itself require several steps involving redirection to various processes (e.g., login server, identity broker), and/or out-of-band (non-HTTP) transactions among middleware components, such as inquiries to Novell NDS, Microsoft directory services, and/or other directory services software. The step 706 may utilize Novell Directory Services software, Lightweight Directory Access Protocol ("LDAP") software, RADIUS, and/or Secure Sockets Layer software, for instance, to provide authentication information about the client 100, 504. The policy enforcement data subsequently obtained 708 by the proxy 502/1102 depends on the authentication information provided during step 706. If the client 504 is located outside a secure network 506, then step 706 may involve use of an URL transformer to replace instances of "http" which refer to locations inside a secure network by corresponding instances of "https" which refer to the same locations. Such URL transformation is described in U.S. patent application Ser. No. 09/268,795 filed Mar. 16, 1999, which is incorporated herein.

During an obtaining step 708, the proxy 502/1102 obtains policy enforcement data that reflects the determination made by the policy module 608. The policy enforcement data may be digitally signed to prevent imitation or manipulation of valid policy enforcement data. The policy enforcement data may be provided to the proxy 502/1102 directly by the policy module 608.

In some cases, however, the policy enforcement data is provided to the proxy 502/1102 by way of the client 504. This may be done through another redirection. In particular, after verifying the client's authority to make the request and preparing corresponding policy enforcement data, the policy module 608 may embed the policy enforcement data in a command redirecting the client 504 back to the previous URL, namely, the URL identifying the proxy 502/1102. The policy module does not necessarily know the address or URL of the proxy 502/1102. If all of these services are on the same computer, then the policy module 608 would know the address of the proxy 502/1102, which is the address of the policy module 608 itself. Otherwise the policy module 608 can generally determine the proxy 502/1102 address through configuration data.

Embedding auxiliary information as text in a URL is a commonly used technique. Thus, the obtaining step 708 may need to extract the policy enforcement data from a redirection address field, such as an URL.

During a token generating step 710, the proxy 502/1102 generates a state token based on the policy enforcement data obtained during step 708. If step 708 provided the proxy 502/1102 with policy enforcement data embedded as text in an address field or URL in a redirection command, then step 710 includes the step of extracting the policy enforcement data.

In general, a state token is a data structure that contains state data that helps define a contextual relationship between particular computer processes. For instance, "cookies" used to define the context of a relationship between a client 100, 504 and an origin server 102 are state tokens.

In operation, the present invention may utilize conventional state tokens or novel state tokens, and it often utilizes both. With regard to conventional state tokens, the proxy 502/1102 forwards between a client 100, 504 and an origin server 102 cookies generated by the origin server 102 or generated by the client 100, 504 in response to a request from the origin server 102. With regard to novel state tokens, the proxy 502/1102 generates a novel cookie during step 710. This cookie is novel in that it contains an indication to the proxy server 502/1102 that the client 100, 504 has been authorized by the policy module 608 to use the proxy 502/1102 to access a resource of the origin server 102. The indication may take the form of a key whose checksum can be verified by the proxy 502/1102, or a rights certificate whose digital signature can be verified by the proxy 502/1102, for instance.

During a step 712 the proxy 502/1102 sends the cookie or other state token to the client 100, 504 with a "set cookie" command or other indication that the client 100, 504 should henceforth use that token in communications with the proxy 502/1102. This will allow the proxy 502/1102 to readily determine that the context of its communications with this client 100, 504 includes the authorization provided by the policy module 608. The transmitting step 712 may transmit the policy state token in a cookie in a header sent from the proxy 502/1102 to the client 100, 504. For convenience in distinguishing a cookie sent during step 712 from other cookies, such a cookie is referred to as a "step 712 token", a "transparent-proxy-client cookie", or the like.

Note that the client 100, 504 receives the step 712 token in response to a sequence of events resulting from the client's request during step 700 for access to the origin server 102. Thus, from the perspective of the client 100, 504, the step 712 "set cookie" command is a requirement imposed by the origin server 102 before the origin server 102 will satisfy the client's step 700 request. In some embodiments, the requirement appears to be imposed by the origin server 102 because the proxy 502 is transparent to the client 100, 504. The client 100, 504 normally will therefore accept the requirement of using the step 712 token. In particular, in the context of HTTP or HTTPS requests, the client 100, 504 will include the transparent-proxy-client cookie in the header of a renewed request for access to the origin server 102.

The renewed request is received by the proxy 502/1102 during a step 714.

If the proxy 502 determines that the transparent-proxy-client cookie in the renewed client request authorizes the client's use of the proxy's services, then the proxy 502 will accept the token during a step 716, and forward the request without the transparent-proxy-client cookie to the origin server 102 during a step 720.

Likewise, if the known novel proxy 1102 accepts the step 712 proxy cookie, then the proxy 1102 forwards the request (but not the proxy cookie) to the origin server during step 720. The proxy cookie is preferably not forwarded to the origin server 102 because that cookie is not needed by the origin server 102; the proxy cookie is used by the proxy 502/1102 to identify the user to that proxy 502/1102. Moreover, the proxy cookie is preferably not forwarded to the origin server 102 because the proxy cookie may contain authorization information (pertaining to client use of the proxy 502/1102) that could be misused if it became available outside the context of legitimate communications between the proxy 502/1102 and the client 100, 504.

A proxy fail over step 718 may occur if the proxy 502/1102 that generated and sent the proxy cookie during steps 710, 712 becomes unavailable to the client 100, 504. The proxy 502/1102 might be taken out of service for maintenance, for instance, or it might suffer a hardware or software failure. A given proxy 502/1102 might also become unavailable to a particular client even though that proxy 502/1102 continues to serve other clients, to promote load balancing among two or more proxies 502/1102.

Proxy failover during step 718 may include several of the steps shown elsewhere in FIG. 7, with a second proxy 502/1102 taking the place of the first proxy 502/1102. For instance, a token generated by a first transparent proxy 502 could be received by a second transparent proxy 502 when the first transparent proxy 502 becomes unavailable. This occurs when steps 700 through 712 occur with the first proxy 502 but step 714 involves the second proxy 502. Instead of accepting 716 the token generated by the first proxy, the second proxy may redirect the client to the policy module so a determination can be made regarding the client's authority to use the second proxy. This may be accomplished by repeating steps 702 through 714 with the second proxy 502 rather than the first proxy 502. If authorization is granted, then the second proxy accepts the new token (e.g., second-proxy-client cookie) during step 716 and the method proceeds with the second proxy rather than the first proxy forwarding the request during step 720, and so on.

After the (first, second, etc.) proxy 502/1102 accepts the client's renewed request and forwards the portion that pertains to the origin server 102, the origin server will normally send a reply during a step 722. From the perspective of the origin server 102, the reply is sent to a client 100; the proxy 502 is transparent to the origin server 102.

As indicated by a step 724, the origin server 102 may itself make "set cookie" or similar requests to the proxy 502/1102, because the origin server 102 treats the proxy 502/1102 as if the proxy 502/1102 were actually a client 100. The proxy 502/1102 process generally accepts the cookie or other token and acknowledges acceptance by returning a copy of the cookie or other token to the origin server in subsequent communications. Such origin-server-proxy cookies may be forwarded by the proxy 502/1102 to the client 100, with modifications identifying the proxy server 502/1102 instead of the origin server 102 as the source of the cookie, since the client 100 views the proxy 502/1102 as being the origin server 102.

More generally, during a step 726 which includes one or more subsequent communications between the client 100, 504, the proxy 502/1102, and the origin server 102, the proxy transparently forwards information between the client 100, 504 and the origin server 102. That is, the proxy 502/1102 ensures that communications between the client 100, 504 and the origin server 102 do not violate the policy reflected in the policy enforcement data provided by the policy module 608. Except to enforce policy, the proxy 502/1102 does not interfere with communications between the client 100, 504 and the origin server 102.

The goal of avoiding interference follows in some embodiments from the preferably transparent nature of the forwarding performed by the proxy.

"Transparent" does not mean "undetectable", for the presence of a transparent proxy 502 may be detected by noting the redirection during step 702, for instance. Rather, "transparent" means that the effects of the proxy 502/1102 on the client are limited to policy enforcement. No software or hardware specific to the present invention need be installed on either the client or the origin server; the redirection steps are accomplished using standard protocols such as HTTP. Some additional communications are required of the client, such as redirection steps, but these additions normally cause only a very small reduction in system throughput.

Steps according to the present invention may be performed in an order other than that shown, may be performed concurrently, may be repeated, may be omitted, and/or may be renamed or grouped differently than shown, provided they accomplish the claimed process. For instance, the proxy failover step 718 may include instances of steps 702-714, as noted above. Steps 702-716 may be repeated to direct a given client to one policy module 608 for multiple authorizations, or to several policy modules 608 before contacting the origin server 102, for instance.

Steps 718 (proxy failover) and/or 724 (origin server imposing cookie on proxy) may be omitted. The method as performed by a particular client and/or proxy may terminate at various points, after all steps expressly set forth in a given claim. Similar considerations apply to FIGS. 5 and 6, and FIG. 10, in that the architecture and inventive signals may have repeated elements, omitted elements, and differently grouped or named elements, in different embodiments of the invention, according to the claims.

Data Flow

Figure 8:
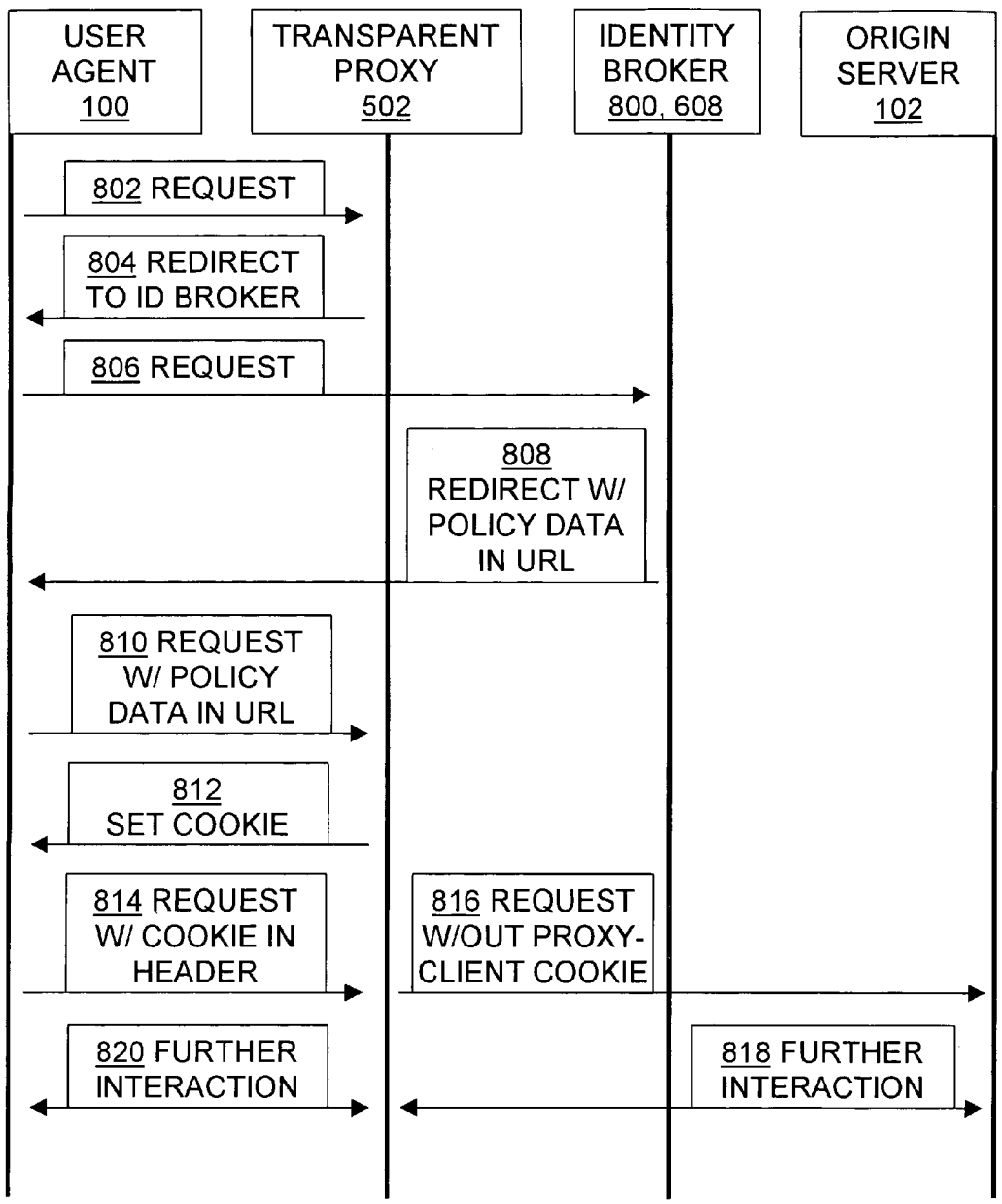
FIG. 8 is a data flow diagram further illustrating tools and techniques of the present invention in which a transparent proxy server supports cookies.
Figure 9:
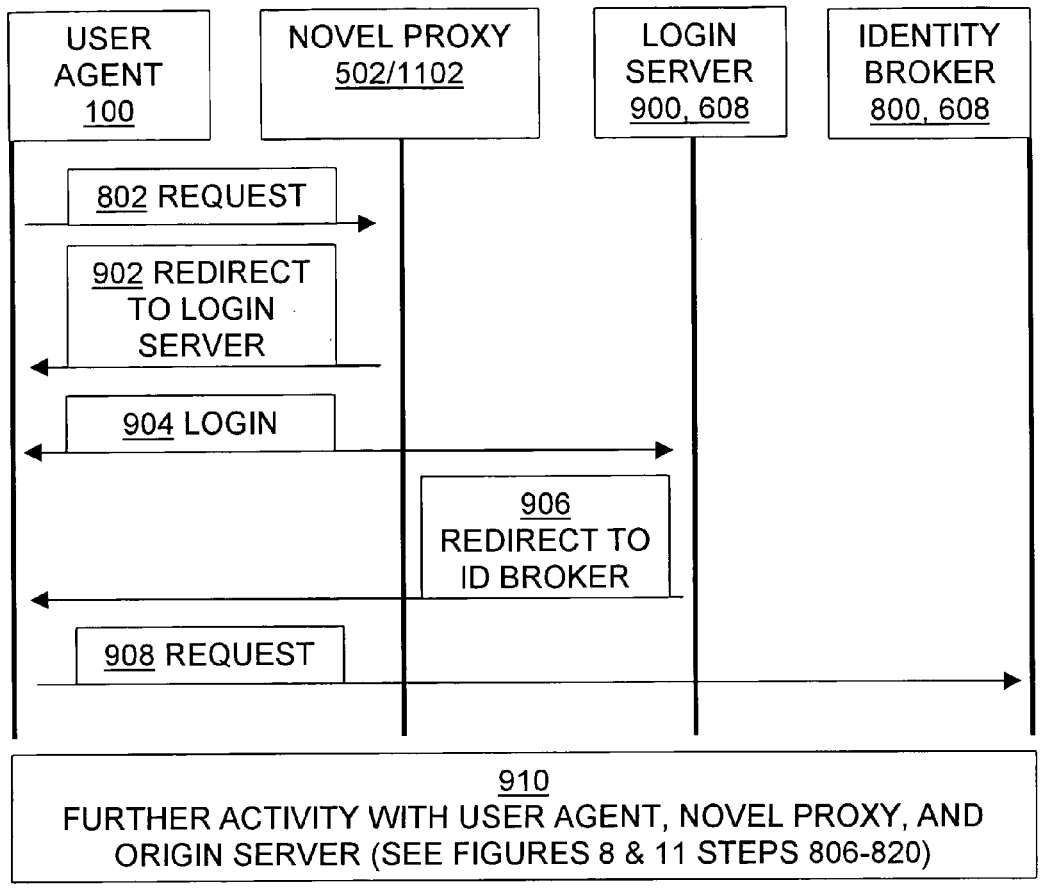
FIG. 9 is a data flow diagram further illustrating tools and techniques of the present invention in which a user agent is redirected to two policy modules (a login server and an identity broker) before the transparent proxy server forwards the user agent's request to the origin server.

FIGS. 8, 9, and 11 illustrate the flow of data in a distributed computing system such as the system 500 during the performance of methods according to the invention, including without limitation the methods shown in FIG. 7. As shown in FIG. 8, the present invention provides use of a transparent proxy server 502 without blocking cookies; as shown in FIG. 11, the invention provides analogous use of a known novel proxy 1102. Either or both uses may be achieved in systems that include an identity broker 800. The identity broker 800 can run as a separate process on the same computer as the proxy 502/1102, or on a separate computer. Although the identity broker 800 and the proxy 502/1102 are shown as separate in FIGS. 8 and 11, they may be implemented in a single program as different threads or merely as different functions. Alternately, the identity broker 800 and the proxy 502/1102 may run as separate programs, possibly on separate computers in the network 506.

The user agent 100 sends a request 802 for access to a resource of the origin server 102. The user 100 may be a user task for a human who is using the system 500, or the agent 100 may be a system task which is created by the system software or by some application program. Unbeknownst to the user agent 100, the request 802 may go to the transparent proxy 502; in other cases, the user agent 100 intentionally directs the request 802 to the known novel proxy 1102. In either case, the proxy 502/1102 replies with a redirect request 804, as discussed in connection with redirecting step 702. The user agent 100 accepts the redirect request as if it had come from the origin server 102, on the assumption that the origin server's location has changed. Accordingly, the user agent 100 sends 806 the request again, but this time sends the request to the identity broker 800. This transmission 806 may include data identifying the proxy 502/1102, embedded into, munged, or otherwise attached to the URL as discussed above, possibly with a corresponding signature.

The identity broker 800 then takes steps that either deny or grant the implicit request by the client 100 to use the proxy 502/1102 to access the origin server 102. Suitable steps include those discussed in connection with authenticating step 706; as noted, NDS, RADIUS, SQL, and other familiar authentication tools and techniques may be used. Assuming the request is granted, the identity broker 800 and the client 100 then send the corresponding policy enforcement data to the proxy 502/1102 by steps that may include embedding that data as text in an URL which redirects 808 the client back to the proxy 502/1102. In response to the redirection 808, the client sends 810 the proxy 502/1102 the policy enforcement data. The proxy 502/1102 parses the URL to extract the policy enforcement data during step 708.

The proxy 502/1102 uses the extracted data prepare 710 a "set cookie" request 812. In response, the user agent 100 accepts the "cookie" request and responds with a renewed request 814 containing the cookie in the header. The proxy 502/1102 receives 714 the cookie, accepts it (this may involve verifying a signature or checksum) 716, and then forwards 720 to the origin portion of the request 814 which does not include the policy cookie sent by the client 100.

As noted in connection with steps 724, 726 and the cookie-specific instances 818, 820, there will often be further interaction between the origin server 102 and the proxy 502/1102, and between the proxy 502/1102 and the user agent 100. To the extent that the further interaction 818 involves further "set cookie" requests from the origin server 102, they are handled by the proxy 502/1102 as if the proxy 502 were the client. Of course, the proxy 502/1102 can also perform caching, filtering according to IP addresses, and other conventional proxy server functions.

FIG. 9 illustrates a variation on the approach shown in FIGS. 8 and 11; the variation requires authentication of the user agent 100 by a login server 900 in addition to use of the identity broker 800. In an alternative embodiment, the login server 900 is used in place of the identity broker 800. As shown, the request 802 is received by the proxy 502/1102, and then redirected 902 to the login server 900. Messages 904 are exchanged between the user agent 100 and the login server 900 to authenticate the user agent 100 to the system 500. The login server 900 may use Novell Directory Services software, Novell NetWare software, Microsoft networking software, and/or other network software. Certificates, tokens, passwords, keys, signatures, encryption, biometrics, and other authentication tools and techniques may be used during the login exchange 904. After the user agent 100 is authenticated and/or otherwise logged in, the login server 900 sends a message 906 redirecting the user agent to the identity broker 800; this is essentially the same as the message 804 discussed above. In response, the user agent 100 sends its request 908 to the identity broker 800; this is essentially the same as the message 806 discussed above. Further activity 910 then occurs, essentially as discussed in connection with FIG. 8.

The login process may grant the user agent 100 access it would not otherwise receive. Step 904 and subsequent steps by the client 100 may be performed according to the teachings of the "SSL-izer" invention described and claimed in commonly own copending U.S. patent application Ser. No. 09/268,795, whose teachings are incorporated herein by reference. That is, when the user agent 100 is located outside a secure intranet and the origin server 102 targeted by the request 802 is located inside the secure intranet, then the proxy 502/1102 or another server may perform URI transformation and other steps to promote the use of HTTPS rather than HTTP. The system 500 may also use other tools and techniques to provide secure external access to internal web servers.

Signals Generally

Figure 10:
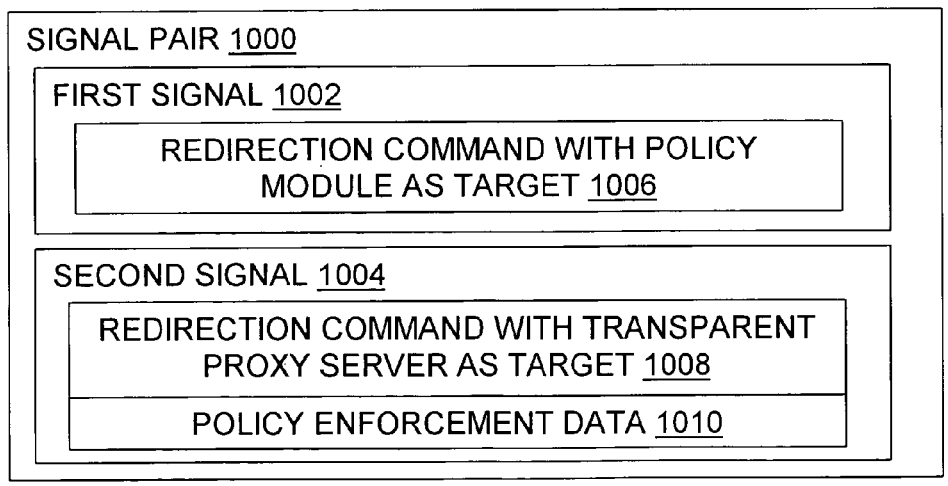
FIG. 10 is a diagram illustrating novel signals of the present invention.

FIG. 10 illustrates signals according to the present invention. A pair 1000 of signals includes a first signal 1002 and a second signal 1004. The first signal 1002 corresponds generally with method step 702 and with data flow item 804.

Thus, the first signal 1002 includes a redirection command which specifies a policy module 608 address as a redirection target. The policy module 608 address may be an identity broker 800 address, for instance, or a login server 900 address as the policy module address. The address may be a URL or other URI, or it may be a network address such as an IP address or an Ethernet address.

The second signal 1004 corresponds generally with steps 706-708 and with data flow items 808-810. Thus, the second signal 1004 includes a redirection command which specifies the proxy server 502/1102 address as a redirection target and also includes policy enforcement data. The included policy enforcement data grants or denies authorization for the client 100, 504 to use a service of the proxy server, such as the service of accessing the origin server 102 by way of the proxy server 502/1102. In some embodiments, the second signal 1004 includes the policy enforcement data embedded in an address field with the proxy 502/1102 address, as when the data is munged into or otherwise embedded in the URL text. The signals 1002, 1004 may be implemented in data structures in various ways. For instance, signal components may be placed in a different order from that shown in the Figures, may be omitted (unless called for in the claims), and may be supplemented with other components such as error detection and correction codes, timestamps, and/or digital signatures. A wide variety of data structure field sizes and data encodings are possible. The signals 1002, 1004 may also be embodied in the system 500 in various media. For instance, they may take the form of data structures stored on a disk or in RAM memory, and/or the form of signals on one or more network 506 signal lines.

SUMMARY

The present invention provides a method for transparently brokering state information exchanged between computers when the information is exchanged using HTTP, HTTPS or another protocol above the network transport layer. For instance, in some embodiments the method includes the steps of: receiving 700 at the transparent proxy 502 a request from the client 100, 504 requesting a web page or other resource of an origin server 102;

redirecting 702 the client 100, 504 request from the transparent proxy 502 to a policy module 608 such as an identity broker 800 or login server 900;

obtaining 708 at the transparent proxy 502 policy enforcement data provided by the policy module 608 through access to NDS and/or another authentication tool;

generating 710 at the transparent proxy 502 a cookie or other policy state token in response to the policy enforcement data;

transmitting 712 the policy state token from the transparent proxy 502 to the client 100, 504;

receiving 714 at the transparent proxy 502 a renewed client request for the origin server 102 resource, the renewed request containing the policy state token as a cookie in an HTTP header or otherwise;

forwarding 720 to the origin server 102 a portion of the renewed request, the forwarded portion omitting the policy state token; and receiving 722 at the transparent proxy 502 a reply from the origin server 102. In some cases (see step 724) the reply contains an origin state token for use by the transparent proxy 502 in its subsequent communications with the origin server 102.

In some cases the method also includes transparently forwarding 726 to the client 100, 504 at least a portion of a communication from the origin server 102, and transparently forwarding 726 to the origin server 102 at least a portion of a communication from the client 100, 504.

The present invention also provides a transparent proxy server 502. The proxy 502 has a memory 600 configured at least in part by a transparent proxy process, a processor 602 for running the transparent proxy process, at least one link 604 for networked communication between the transparent proxy process, a client computer 504, and an origin server 102, and a policy module 608 identifier such as an URL which identifies a policy module 608 that grants or denies authorization of proxy 502 services implicitly sought by the client 504.

The transparent proxy server 502 thus provides authorized proxy service transparently to both a client computer 504 and an origin server 102 by steps which comprise receiving 700 a request from the client 504 for a resource of the origin server 102, sending 712 the client 504 an authorization by the policy module 608 for the client 504 to use a transparent proxy 502 service such as permitting the client 504 to communicate with the origin server 102 via the proxy 502, accepting 714-716 the authorization from the client 504 with a renewed client request for the origin server 102 resource, forwarding 720 the renewed client request to the origin server 102 without forwarding the authorization but with an indication to the origin server 102 that the transparent proxy server 502 is the source of the forwarded request, and then transparently forwarding 726 the requested resource from the origin server 102 to the client 504.

An additional transparent proxy server 502 may also be used in a system 500 according to the invention. For instance, one transparent proxy server 502 may forward client requests to the other transparent proxy server, which in turn forwards them to the origin server 102 (or to yet another proxy). As another example, one transparent proxy server 502 may take over the handling of client requests in place of the other transparent proxy server when the other proxy becomes unavailable to the client.

The invention also provides a pair 1000 of state information brokering signals embodied in a distributed computer system 500. The system 500 contains at least a client 504, a transparent proxy server 502 having an address such an URL or network address, and a policy module 608 having an address. The first signal 1002 includes a redirection command which specifies the policy module address as a redirection target. The second signal 1004 includes a redirection command which specifies the proxy 502 address as a redirection target and also includes policy enforcement data which grants or denies authorization for the client 504 to use the proxy 502.

Methods of the invention may also be embodied in a computer storage medium having a configuration that represents data and instructions which will cause performance of method steps for transparent proxy services. For instance, the method may include the steps of receiving 700 at a proxy 502 a request from a client requesting a resource of an origin server 102; redirecting 702 the client request from the proxy to a policy module 608; and obtaining 708 at the proxy policy enforcement data provided by the policy module. The policy enforcement data grants or denies authorization for the client 504 to access the resource through the transparent proxy 502. In cases involving proxy failover, two transparent proxies 502 can be used. The initial policy enforcement data grants authorization for the client 504 to access the origin server 102 resource through the first proxy. The first proxy generates a proxy cookie in response to the first policy enforcement data, and transmits the proxy cookie to the client. Then the first proxy becomes unavailable, so the second proxy receives the first proxy cookie from the client with the renewed client request for the origin server resource. The second proxy redirects the renewed client request to a policy module (possibly the same policy module 608 to which the first proxy sent the client). The policy module authorizes use of the second proxy by the client, so the second proxy accepts second policy enforcement data provided by the policy module. The second proxy then transparently forwards communications between the client 504 and the origin server 102.

Of course, those of skill in the art will appreciate that many other configurations are possible using the invention. In particular and without limitation, the present invention can be used with a URI transformer that modifies non-secure URIs in data being sent from a target server to a client by replacing them with corresponding secure URIs to promote continued use of secure sockets layer communication, as described in commonly owned copending application Ser. No. 09/268, 795.

Although particular methods (FIGS. 7-9), systems (FIGS. 5 and 6), and signal formats (FIG. 10) embodying the present invention are expressly illustrated and described herein, it will be appreciated that embodiments may be formed according to the present invention in various categories, such as the method, system, signal, and configured medium categories. Unless otherwise expressly indicted, the description herein of embodiments of the present invention in one category therefore extends to corresponding embodiments in the other categories. As used herein, terms such as "a" and "the" and item designations such as "client" are generally inclusive of one or more of the indicated item. In particular, in the claims a reference to an item generally means at least one such item is required.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A method implemented and residing within a non-transitory computer-readable storage medium, comprising:
   intercepting, at a transparent proxy, a request from a client, the request for a resource of an origin server and directed initially by the client to the origin server;
   obtaining, by the transparent proxy, policy enforcement data that grams the client access to use the transparent proxy based on the policy enforcement data and the policy enforcement data is digitally signed;
   producing, by the transparent proxy a policy state token based on the policy enforcement data;
   sending, by the transparent proxy, the policy state token to the client for authentication of the client at the transparent proxy during subsequent interactions, the policy state token maintains a relationship among the client, the transparent proxy, and the origin server and serves as authorization for the client to use the transparent proxy to access the resource of the origin server;
   managing, by the transparent proxy, communications associated with the policy state token, the transparent proxy acting as an intermediary between the client and the origin server; and
   managing all interactions between the client and the transparent proxy via existing network protocols and without changes to the client or the transparent proxy and using a second transparent proxy to provide failover for the transparent proxy when the transparent proxy becomes unavailable to continue to manage the interactions.

2. The method of claim 1, wherein obtaining further includes extracting the policy enforcement data from a redirection address field.

3. The method of claim 1 further comprising, receiving at the transparent proxy a renewed request for the origin server resource, the renewed request containing the policy state token.

4. The method of claim 1, wherein sending further includes representing the policy state token as a cookie.

5. The method of claim 1, wherein sending further includes including a key in the cookie whose checksum is verified by the transparent proxy.

6. The method of claim 1, wherein managing communications further include presenting, by the transparent proxy, the policy state token that appears to have originated from the client from the perspective of the origin server.

7. The method of claim 1, wherein managing all communications further includes using Hyper Text Transfer Protocol (HTTP) and HTTP over Secure Sockets Layer (HTTPS) as the existing network protocols.

8. The method of claim 1, wherein managing all communications further includes using Lightweight Directory Access Protocol (LDAP) as the existing network protocols.

9. The method of claim 1, wherein managing all communications further includes using Secure Sockets Layer (SSL) protocol as the existing network protocols.

10. The method of claim 1 further comprising, utilizing Lightweight Directory Access Protocol software to provide authentication information for the client, and the policy enforcement data obtained by the transparent proxy depends on the authentication information as provided.

11. A transparent proxy server comprising:
    a memory configured at least in part by a transparent proxy process;
    a processor for running the transparent proxy process;
    at least one link for networked communication between the transparent proxy process, on the one hand, and a client computer and an origin server, on the other hand; and
    a policy module identifier which identifies a policy module that grants or denies authorization of proxy services to the client computer by acquiring policy enforcement data and attempting to authenticate the client computer to the transparent proxy process in response to the policy enforcement data, the policy enforcement data provides an indication that the client can use the transparent proxy process and based on the policy enforcement data the client is granted access to the transparent proxy process, and the policy enforcement data is digitally signed, and the client computer directs a request for a resource to an origin server and the request is intercepted by the transparent proxy process, which is unknown to the client computer, and used to determine the policy module identifier which identifies the policy module, and the policy module authenticates the client computer to the transparent proxy process for subsequent interactions between the client computer and the transparent proxy process, and the transparent proxy creates a transparent proxy cookie for the relationship among the client, the origin server, and the transparent proxy, and the transparent proxy manages the transparent proxy cookie on the client, and the transparent proxy acting and an intermediary between the client and the origin server for managing cookie communications, and all interactions between the client and the transparent proxy are done via existing network protocols and without changes to the client of the transparent proxy and using a second transparent proxy to provide failover for the transparent proxy when the transparent proxy becomes unavailable to continue to manage the interactions.

12. The transparent proxy server of claim 11, wherein the transparent proxy process presents origin cookies to the client as if the transparent proxy process were the origin server.

13. The transparent proxy server of claim 12, wherein the transparent proxy process presents client cookies to the origin server as if the transparent proxy process were the client.

14. The transparent proxy server of claim 11, wherein the policy module and the transparent proxy process are running on the same computer.

15. The transparent proxy server of claim 11, wherein the transparent proxy process sends the client computer the authorization by sending the client computer the transparent proxy cookie for use in subsequent communications from the client computer.

16. A method implemented and residing within a non-transitory computer-readable storage medium, comprising:
managing, at a transparent proxy, communications occurring between a client and an origin server;
maintaining, by the transparent proxy, key information used to authenticate the client to the origin server, the origin server to the client, the client to the transparent proxy, and the origin server to the transparent proxy; and
managing, by the transparent proxy, all interactions between the client and the transparent proxy via existing network protocols and without changes to the client or the transparent proxy, the client granted access to the transparent proxy based on policy enforcement data that is digitally signed and using a second transparent proxy to provide failover for the transparent proxy when the transparent proxy becomes unavailable to continue to manage the interactions.

17. The method of claim 6 further comprising, submitting by the transparent proxy a key on behalf of the client to the origin server to authenticate the client for access to a resource of the origin server where the origin server believes the key is originating from the client.

18. The method of claim 16 further comprising, submitting by the transparent proxy a key on behalf of the origin server to the client to authenticate the origin server for access to the client where the client believes the key is originating from the origin server.

19. The method of claim 16, wherein maintaining further includes managing, by the transparent proxy, portions of the key information associated with the client from the client machine.

20. The method of claim 16, wherein maintaining further includes managing, by the transparent proxy, portions of the key information associated with the origin server from the origin server machine.

* * * * *

UNITED STATES PATENT AND TRADEMARK OFFICE
CERTIFICATE OF CORRECTION

PATENT NO. : 8,850,017 B2
APPLICATION NO. : 13/118185
DATED : September 30, 2014
INVENTOR(S) : Ebrahimi et al.

Page 1 of 1

It is certified that error appears in the above-identified patent and that said Letters Patent is hereby corrected as shown below:

In the Claims,

In column 19, line 52, in Claim 1, delete "grams" and insert --grants--, therefor In column 22, line 10, in Claim 17, delete "6" and insert --16--, therefor Signed and Sealed this
Thirteenth Day of January, 2015

Michelle K. Lee
*Deputy Director of the United States Patent and Trademark Office*